UNITED STATES PATENT OFFICE.

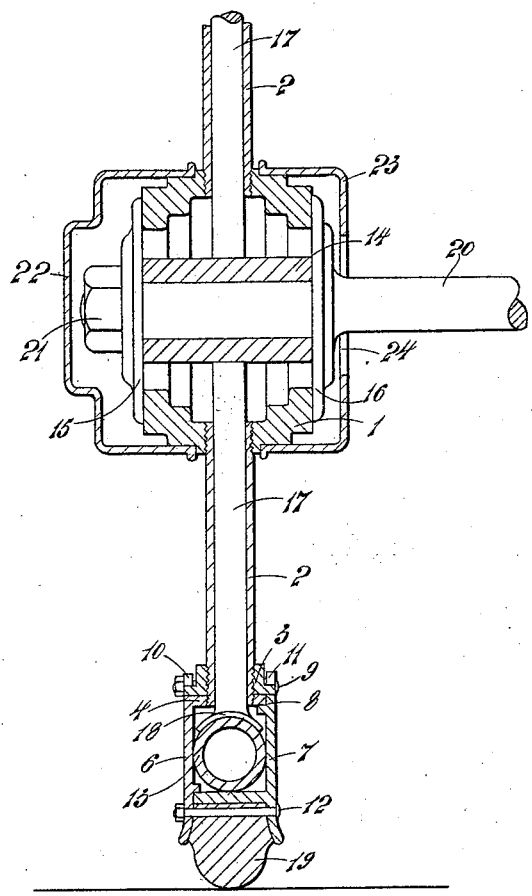

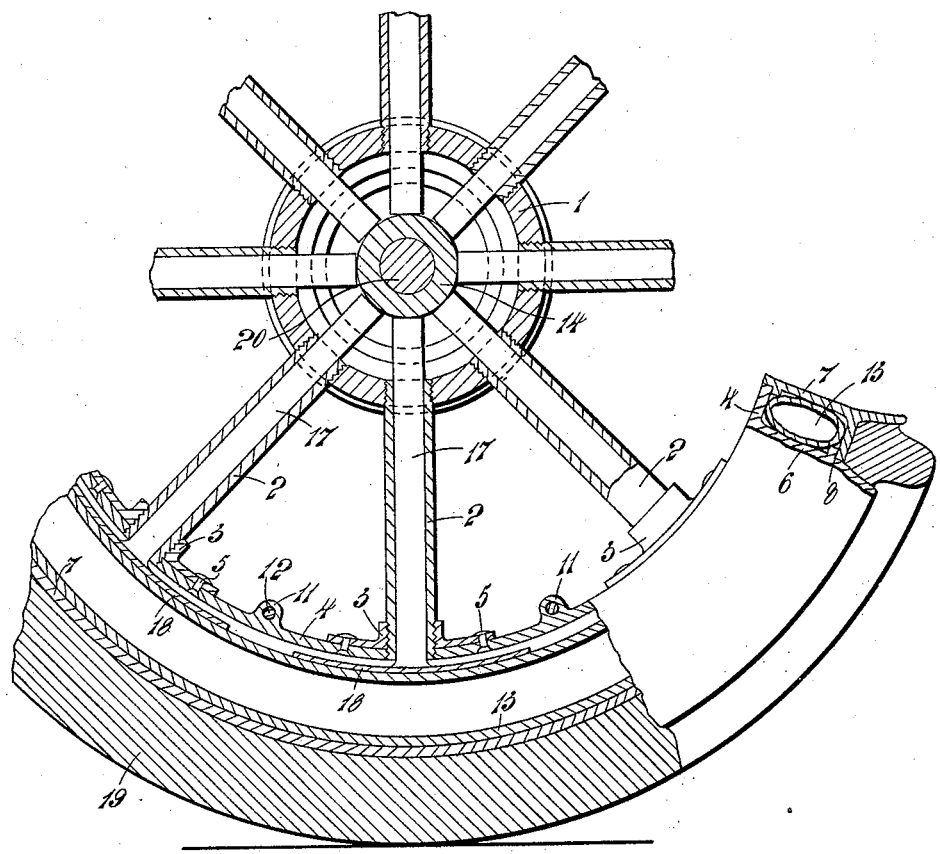

ARTHUR BURFOOT AND JASPER BURFOOT, OF AUCKLAND, NEW ZEALAND.

PNEUMATIC WHEEL.

1,047,495.

Specification of Letters Patent. Patented Dec. 17, 1912.

Application filed March 6, 1907. Serial No. 360,978.

*To all whom it may concern:*

Be it known that we, ARTHUR BURFOOT and JASPER BURFOOT, subjects of His Majesty the King of Great Britain and Ireland, residing at Auckland, in the Provincial District of Auckland, in the Colony of New Zealand, have invented certain new and useful Improvements in Pneumatic Wheels, of which the following is a specification.

This invention relates to wheels used upon vehicles, motor cars, bicycles and the like and the object of the invention is to provide a wheel which shall have great resiliency and so constructed that its parts may be easily renewed or replaced.

Further objects of the invention are to protect pneumatic tires from puncture, great rigidity and strength of wheel and protection of the spokes of the wheel from breakage and weather.

The invention consists in constructing a wheel as follows:—The hub of the wheel is made hollow and is provided with hollow spokes upon the outer ends of which the felly of the wheel is secured. The axle of the vehicle passes through a boss incased within the hollow hub by washers passed upon the axle and fitting against the sides of the hub. Spokes having their ends bearing against the boss pass through the hollow spokes of the hub and through the felly of the wheel and are provided with shoes at their outer ends. A pneumatic tire fitting around the felly and the shoes is secured in position and protected from puncture and wear and tear by a casing flanged on one side to fit against the felly of the wheel and whereto it is secured. The casing has a short flange upon its other side. The casing is secured upon the felly by an annular flange which is rabbeted to receive the short flange of the casing and to which it is secured, the said flange being also secured to the felly of the wheel. If desired the outside of the casing may be provided with a rubber tread to prevent noise when running. When in use the weight of the vehicle is transmitted to the shoes and thence to the pneumatic tire.

The drawings illustrate the invention.

Figure 1 is a sectional elevation, and Fig. 2 a part elevation partly in section of the wheel.

The hub 1 is hollow and has screwed into it the hollow spokes 2 which at their outer ends are screwed into sockets 3 fixed to the felly 4 by rivets 5. A flange 6 integral with the felly is secured to the annular bracket 7 which has a rabbet 8 to receive the felly 4, by bolts 9 passing through lugs 10 and 11 integral with the flange 6 and the bracket 7 respectively and by bolts 12. The felly 4, flange 6, and bracket 7 form together a casing wherein is contained the pneumatic tire or tube 13.

The boss 14 contained within the hub 1, is retained therein by lateral washers 15 and 16. Spokes 17 having their inner ends bearing against the boss 14 and fit slidably in the hollow spokes 2 through which they pass and are provided with shoes 18 at their outer ends, which project through the felly 4. The shoes 18 are supported by the pneumatic tire or tube 13.

The annular channel formed by the outside of the casing the flanges 6 and the bracket 7 is fitted with a solid rubber tire 19 secured in position by the bolts 12 which pass through the said tire.

The axle 20 of the vehicle passes through the boss 14 and is provided with a nut 21 for retaining the washers 15 and 16. Caps 22 and 23 fit upon the hub 1 to exclude dust from the interior of the hub, the washer 23 having a hole 24 of large diameter to allow play for the axle.

The weight of the vehicle is transmitted to the pneumatic tube which absorbs concussion after the manner of a pneumatic tire mounted in the ordinary way upon the exterior circumference of a wheel and the said pneumatic tire is thoroughly protected from puncture and damage in its casing.

What we do claim and desire to secure by Letters Patent of the United States is:—

1. In combination with a hollow wheel hub, an axle having a journal which is free to take eccentric positions within said hub, a rim-frame, a series of tubular spokes rigidly connecting said hub and rim frame, a pneumatic tire in the latter and a series of spokes interposed between said tire and the axle journal and free to move endwise individually in said hollow spokes substantially as set forth.

2. A wheel comprising a hollow hub, hollow spokes screwed at their inner ends into the hub, a felly to which the outer ends of the hollow spokes are secured, a casing formed upon the felly, a pneumatic tire contained in the casing, a boss within the hollow hub, spokes bearing at their inner ends agains the boss and fitting slidably into the hollow spokes, shoes secured to the outer ends of the said spokes and resting upon the penumatic tire substantially as set forth.

3. A wheel comprising a hollow hub, hollow spokes screwed at their inner ends into the hub, a felly to which the outer ends of the hollow spokes are secured, a casing formed upon the felly, a pneumatic tire contained in the casing, a boss within the hollow hub, spokes bearing at their inner ends against the boss and fitting slidably in the hollow spokes, shoes secured to the outer ends of the said spokes and resting upon the pneumatic tire, and a rubber tire secured in a circumferential channel around the casing, substantially as set forth.

4. In a wheel a casing for a pneumatic tire comprising a felly, a flange integral with the felly and an annular bracket detachably secured to the flange substantially as set forth.

5. The combination in a wheel of a casing comprising a felly, a flange integral with the felly and an annular bracket detachably secured to the flange, a pneumatic tire within the casing, and a rubber tire disposed in a circumferential channel around the casing substantially as set forth.

6. In combination with an axle a wheel comprising a hollow hub, washers upon the axle and at each side of the hollow hub a nut upon the end of the axle, caps upon each end of the hub, hollow spokes screwed at their inner ends into the hub, a felly to which the outer ends of the hollow spokes are secured, a flange integral with the felly, an annular bracket detachably secured to the flange and provided with a rabbet, extensions of the flanges in conjunction with the annular bracket forming a channel, a pneumatic tire contained by the felly, the flange and the bracket, a rubber tire disposed within the said channel, a boss within the hollow hub, spokes bearing at their inner ends against the boss and fitting slidably in the hollow spokes, shoes secured to the outer ends of the said spokes and resting upon the pneumatic tire, substantially as set forth.

In testimony whereof we have signed our names to this specification in the presence of two witnesses.

ARTHUR BURFOOT.
JASPER BURFOOT.

Witnesses:
J. HENRY MACKIE,
E. F. COURTNEY.

---

Copies of this patent may be obtained for five cents each, by addressing the "Commissioner of Patents, Washington, D. C."